United States Patent
Ishikawa et al.

[11] Patent Number: 5,096,111
[45] Date of Patent: Mar. 17, 1992

[54] METHOD FOR CONTRACTING A CYLINDRICAL BODY

[75] Inventors: Yasushi Ishikawa; Mikio Yamanaka; Yutaka Sadano, all of Sagamihara; Shingo Tanioka, Tokai; Tetsuro Inomata, Tokai; Toshikazu Nakagawa, Tokai, all of Japan

[73] Assignee: Nippon Steel Corporation, Tokyo, Japan

[21] Appl. No.: 599,356

[22] Filed: Oct. 5, 1990

[51] Int. Cl.$^5$ .................. B21D 51/10; B21D 39/00; B23P 19/04; B23P 11/00
[52] U.S. Cl. .................. 228/173.2; 228/173.1; 228/173.6; 228/183; 228/15.1; 29/234; 29/235; 29/890; 29/505; 29/515; 29/283.5; 100/232; 100/42; 72/402
[58] Field of Search .................. 228/173.1, 173.6, 181, 228/173.2, 183, 190, 15.1; 100/41, 42, 232; 72/402; 29/890, 890.036, DIG. 11, 505, 515, 516, 517, 820, 234, 235, 280, 244, 282, 283.5

[56] References Cited

U.S. PATENT DOCUMENTS

| | | | |
|---|---|---|---|
| 579,214 | 3/1897 | Adams | 72/402 |
| 2,998,049 | 8/1961 | Winslow | 29/235 |
| 3,085,316 | 4/1963 | Nelson | 29/517 |
| 3,182,387 | 5/1965 | Sundberg | 29/234 |
| 3,208,131 | 9/1965 | Ruff et al. | 228/173.6 |
| 3,977,065 | 8/1976 | Johnson | 29/237 |
| 4,053,969 | 10/1977 | Bayard | 228/183 |
| 4,093,423 | 6/1978 | Neumann | 29/235 |
| 4,300,956 | 11/1981 | Rosenberger et al. | 228/173.6 |
| 4,381,590 | 5/1983 | Nonnenmann et al. | 228/173.6 |
| 4,519,120 | 5/1985 | Nonnenmann et al. | 29/890 |
| 4,578,982 | 4/1986 | Schröck | 72/402 |

FOREIGN PATENT DOCUMENTS

| | | |
|---|---|---|
| 1590802 | 4/1970 | France. |
| 1551917 | 9/1979 | Great Britain. |
| 2020190 | 11/1979 | Great Britain. |
| 0210062 | 4/1987 | European Pat. Off.. |
| 2182580 | 5/1987 | Great Britain. |
| 5755886 | 11/1982 | Japan. |
| 207252 | 1/1960 | Netherlands ............ 100/232 |

Primary Examiner—Richard K. Seidel
Assistant Examiner—Jeanne M. Elpel
Attorney, Agent, or Firm—Wenderoth, Lind & Ponack

[57] ABSTRACT

A method of diametrically contracting a cylindrical body, includes the steps of grasping the cylindrical body with a plurality of elongated grasping members, preparing a cylindrical drawing die having an opening at one end and a tapered inside peripheral surface, drawing the grasping members together with the cylindrical body into the drawing die, through the opening, and applying a compression force to the cylindrical body through the grasping members due to the passage along through the tapered inside peripheral surface, to thereby cause the cylindrical body to be diametrically contracted. During the drawing process, since the cylindrical body does not come into direct contact with the drawing die, neither scratches nor baking cracks are produced on the outside surface of the cylindrical body.

3 Claims, 7 Drawing Sheets

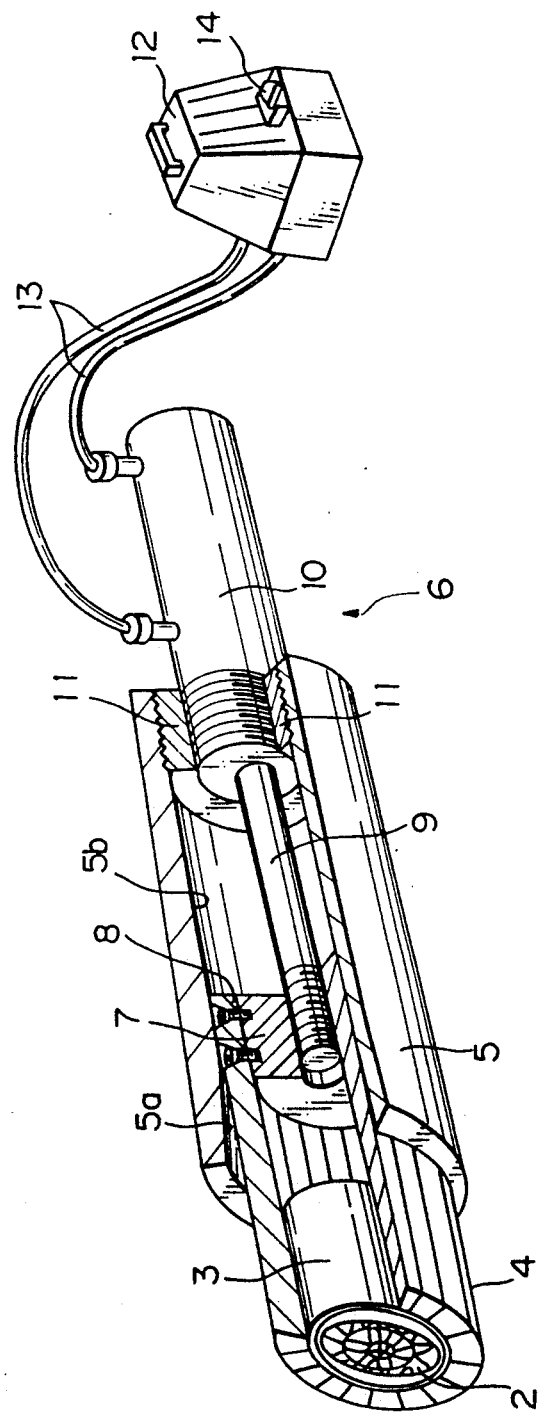

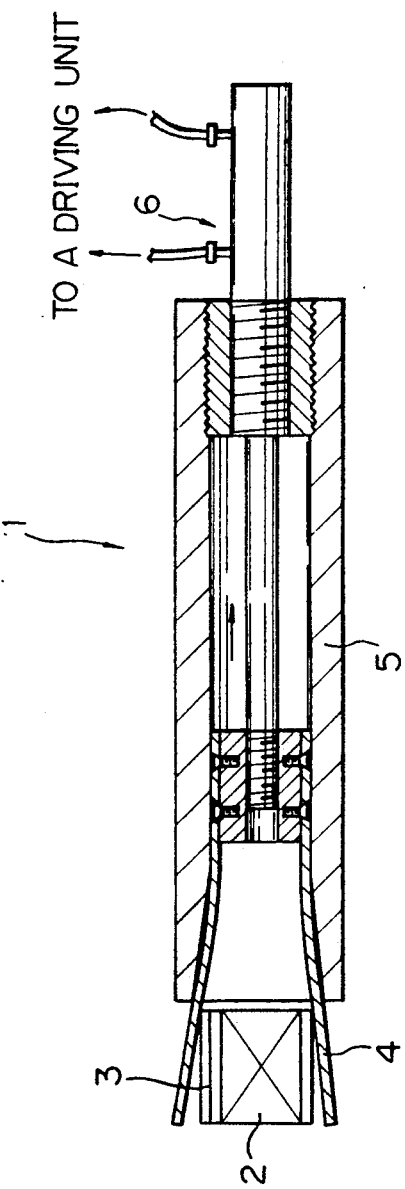
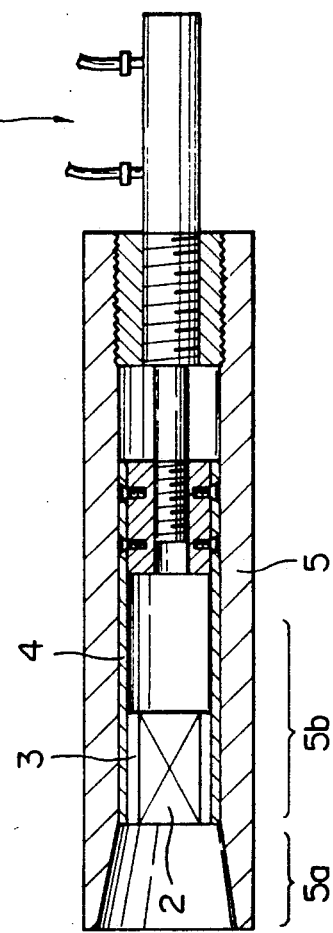

METHOD FOR CONTRACTING A CYLINDRICAL BODY

BACKGROUND OF THE INVENTION

1. Field of the Invention

The present invention relates to a method and an apparatus for diametrically contracting a cylindrical body, and more particularly, it relates to a method and an apparatus for diametrically contracting a hollow cylindrical body after the insertion therein of, for example, a honeycomb member of a catalytic converter for an automobile into the hollow cylindrical body. By diametrically contracting the hollow cylindrical body, the inserted honeycomb member is sealingly retained in the hollow cylindrical body.

Note, although the present invention is described hereinafter with reference to a converter for cleaning the exhaust gas of an automobile, for an easy understanding thereof, the present invention is not limited to this usage.

2. Description of the Related Art

With respect to catalytic converter for cleaning the exhaust gas discharged from an automobile engine, the conventional ceramic converter has been replaced by a metallic carrier having a honeycomb structure and made of a heat resisting sheet metal such as stainless steel, as shown in FIG. 9.

In general, this kind of metallic carrier is produced by the following steps:

winding together a flat stainless steel sheet 2a having a thickness of about 50 μm and a corrugated stainless sheet 2b, to form a cylindrical honeycomb member 2; inserting the member 2 into a hollow cylindrical body 3; and soldering or welding the flat sheet 2a, the corrugated sheet 2b and the hollow cylindrical body 3 to each other. In the above-mentioned method, prior to the soldering or welding step, the honeycomb member 2 must be in uniform contact with the hollow cylindrical body 3 to ensure a satisfactory soldering or welding together thereof, as well as a good contact between the flat sheet 2a and the corrugated sheet 2b.

In the prior art method of integrating the honeycomb member 2 and the hollow cylindrical body 3, as shown in FIG. 10, first a metal sheet is formed into a hollow cylindrical body 3 by either pressing or bending. Next, the honeycomb member 2, on which a solder is coated, is placed inside the hollow cylindrical body 3, and thereafter, the body 3 is tightly fastened around the member 2 by metal bands 22. Then, the butting edges of the hollow cylindrical body 3 are welded together with an arc generated from an electrode 23, and finally, a heat treatment for soldering is applied to the hollow cylindrical body 3 having the honeycomb member 2 contained therein.

In the conventional method described above, however, an unequal residual stress may be produced in the honeycomb member 2, due to the fastening of the hollow cylindrical body 3, and thus the member 2 is deformed during the heat treatment. In another case, the welded portion 31 of the hollow cylindrical body 3 is bent in such a manner that a sectional shape of the hollow body 3 does not form a circle. In this case, an outside periphery of the hollow body 3 must be refinished to recover the roundness thereof and meet the required accuracy for an outside diameter of the hollow body 3. Due to this refinishing, however, the thickness of the body 3 is locally reduced, and thus points having a weak mechanical strength are produced on the periphery of the hollow cylindrical body 3.

To solve the above-mentioned problems in the prior art, Japanese Examined Patent Publication No. 57-55886 discloses a drawing method in which a honeycomb member is inserted into a hollow cylindrical body having a diameter larger than the finished product size. Then, as shown in FIG. 11, a drawing tool 24 is drawn in the direction of an arrow F so that the body 3 containing the honeycomb member 2 therein is passed through the tool 24, whereby the outside diameter of the body 3 is contracted and pressed against the honeycomb member 2.

In this method, however, scratches or baking cracks may be produced on the outside of the body 3, due to friction between the tool 24 and the body 3 occurring during the drawing, and thus the appearance of the body 3 is poor due to the presence of such scratches or baking cracks.

SUMMARY OF THE INVENTION

An object of the present invention is to solve the above-mentioned problem by providing a method and an apparatus for contracting an outside diameter of a hollow cylindrical body with a high accuracy and without producing scratches or baking cracks on the outside surface thereof.

According to the present invention, the above object is achieved by providing a method of diametrically contracting a hollow cylindrical body which contains an element inserted therein with a clearance therebetween, to thereby sealingly fit the hollow cylindrical body to the contained element, by a diametrical contraction of the hollow cylindrical body, which method comprises the steps of grasping the hollow cylindrical body from the outside thereof with a plurality of elongated grasping members arranged to surround the hollow cylindrical body, one end of each grasping member being fixed to a column member, preparing a cylindrical drawing die having an opening at one end thereof, the bore of the die having a tapered part, wherein an inside diameter of at least a portion of the die gradually decreases along the longitudinal axis thereof in a direction away from the opening, drawing the grasping members, together with the hollow cylindrical body, into the drawing die through the opening, and applying a compression force to the hollow cylindrical body through the grasping members as forced radially inward by the tapered inside surface of the die, to thereby diametrically contact the hollow cylindrical body into a sealed contact with the element contained therein.

Furthermore, according to the present invention, there is provided an apparatus for diametrically contracting the hollow cylindrical body having an element inserted therein with a clearance therebetween, to sealingly fit the hollow cylindrical body to the contained element by a diametrical contraction of the hollow cylindrical body, which apparatus comprises a cylindrical drawing die having an opening at one end thereof, the inner bore of the drawing die being having a tapered part wherein an inside diameter of at least a portion of the drawing die gradually decreases along the longitudinal axis thereof in a direction away from the opening, a plurality of members for grasping the hollow cylindrical body from the outside thereof, the grasping members being circumferentially arranged about a column positioned in the bore of the drawing die so that the grasping members can be moved axially in and out of the bore of the drawing die through the opening, an actuator arranged on an opposite side to the opening, the actuator having a movable rod extending axially in the bore, the rod being connected to the column, whereby the actuator moves the grasping members into the bore when diametrically contracting the hollow cylindrical body, and the grasping members being displaceable in accordance with the taper of the bore of the drawing die whereby, when the actuator draws the grasping members into the die, the hollow cylindrical body grasped by the grasping members is forced to pass through the tapered portion of the die, to thereby contract the diameter of the hollow cylindrical body.

According to the drawing process of the present invention, when the hollow cylindrical body is drawn through the cylindrical die, no slippage between the grasping members and the hollow cylindrical body occurs, and therefore, neither scratches nor baking cracks are produced on the outside surface of the hollow cylindrical body.

BRIEF DESCRIPTION OF THE DRAWINGS

FIG. 2 is a partly cut-away perspective view of the apparatus shown in FIG. 1;

FIG. 3 is an axial cross-sectional view of FIG. 1, showing a condition before the drawing in of the grasping members and diametrically contracting the hollow cylindrical body;

FIG. 4 is a view similar to FIG. 3, and showing a condition after the drawing in of the grasping members, whereby the hollow cylindrical body has been contracted to the desired finished product size;

DETAILED DESCRIPTION OF THE PREFERRED EMBODIMENTS

Figure 1:
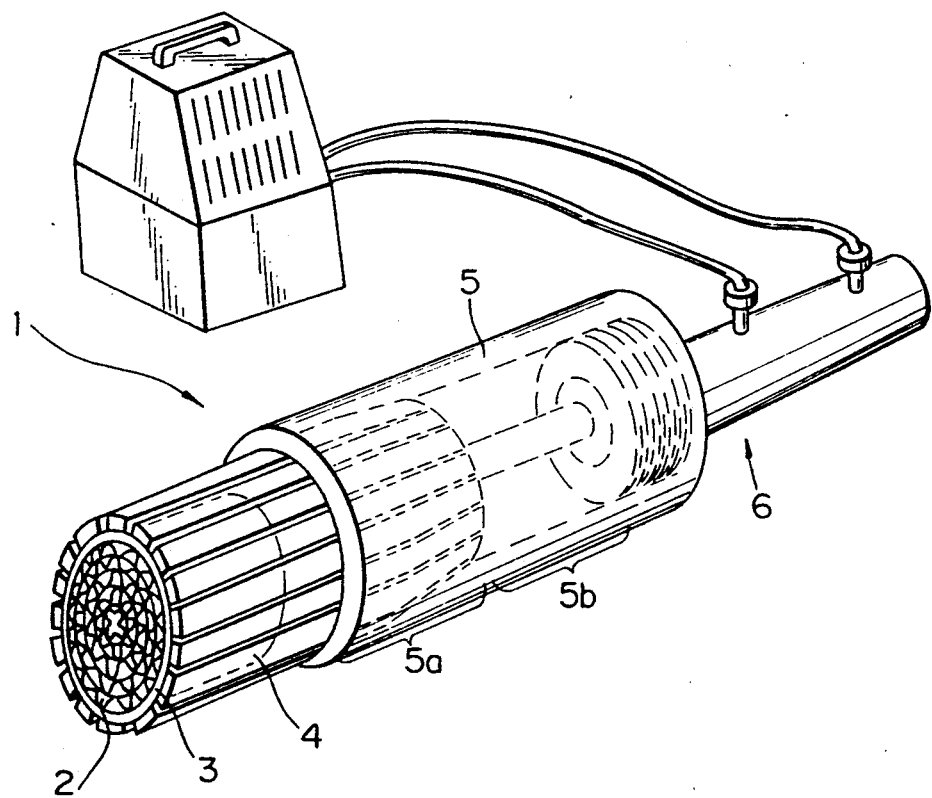
FIG. 1 is a perspective view of an apparatus for diametrically contracting a hollow cylindrical body, according to a first embodiment of the present invention.

Referring to FIGS. 1 and 2, reference numeral 1 designates an apparatus for producing a catalytic converter in accordance with the first embodiment of the present invention, and reference numeral 2 designates a honeycomb member comprising a flat sheet and a corrugated sheet wound together. In the state shown in FIGS. 1 and 2, in which the forming process has not been carried out, the outside diameter of the member 2 is slightly larger than that of the finished member after the forming process is completed.

Reference numeral 3 designates a hollow cylindrical body into which the member 2 can be easily inserted with a clearance therebetween, before the forming process is carried out. The outside diameter of the hollow cylindrical body 3 before forming is larger than the outside diameter of the hollow cylindrical body 3 after the forming process is completed.

In the state before forming, since the inside diameter of the hollow cylindrical body 3 is larger than the outside diameter of the member 2, an operator can easily insert the member 2 into the hollow cylindrical body 3.

As shown in FIG. 1, the apparatus 1 comprises a plurality of elongated members 4 (referred to as grasping members 4 hereinafter) which grasp the hollow cylindrical body 3 from the outside thereof, a cylindrical drawing die 5 having an opening at one end thereof, through which the grasping members 4 can be axially moved, and an actuator 6 such as a hydraulic cylinder for drawing the grasping members 4 axially into the drawing die 5.

As is apparent from FIG. 2, the grasping members 4 each have one end thereof fixed to a column 7, by screws 8, in such a manner that the grasping members 4 are circumferentially arranged around the column 7, and the column 7 is connected to a rod 9 of the actuator 6, by which the column 7 is reciprocatingly moved in the drawing die 5. The actuator 6 includes an actuator body 10, one end of which is screwed into the drawing die 5 through the intermediary of an attachment 11, and the rod 9 protruding from the actuator body 10 is driven by a hydraulic pressure supplied from a drive unit 12 through pipes 13. Note, reference numeral 14 designates an operating lever activated by the operator.

As shown in FIGS. 1 and 2, the bore of the drawing die 5 is provided with a tapered part 5a at the opening thereof, i.e., the inside diameter of the die 5 gradually decreases along the axial dimension of the die 5 in a direction extending away from the opening through which the grasping members 4 are drawn. Furthermore, the tapered part 5a is followed by a straight part 5b having such an inside diameter that an inside diameter of a space defined by the grasping members 4 when in contact with the straight part 5b is substantially the same as the desired finished diameter of the produced catalytic converter.

FIG. 3 shows the stage before the drawing operation is carried out by the apparatus 1. Each of the grasping members 4 is made of a flexible material, such as thin stainless steel, and as shown in this figure, the members 4 are formed in such a manner that they can bend radially outward, and thus be spaced from each other. Due to this arrangement, an inside diameter of a space defined by the grasping members 4 when outside the drawing die 5 is greater than an outside diameter of the hollow cylindrical body 3 before forming, and thus the operator is able to fit the hollow cylindrical body 3 into the defined space without difficulty.

After fitting the hollow cylindrical body 3 into the grasping members 4, so that they grasp the outside surface of the hollow cylindrical body 3 as mentioned above, the operator actuates the operating lever 14 of the driving unit 12 (FIG. 2) and the actuator 6 causes the grasping members 4 to be drawn into the drawing die 5. Consequently, the hollow cylindrical body 3 containing the honeycomb member 2 is forced to pass through the tapered part 5a and into the following straight part 5b of the drawing die 5, whereby the diameter of the hollow cylindrical body 3 is contracted, and further, the honeycomb member 2 is brought into firm contact with the inside surface of the hollow cylindrical body 3, and accordingly, a catalytic converter having an accurate desired outside diameter is produced, as shown in FIG. 4.

Then, by operating the actuator 6 in an opposite direction to that of the drawing process, the finished product, i.e., the catalytic converter, is pushed out of the drawing die 5 by the grasping members 4, to a point at which the operator can easily pick up the finished product.

According to this embodiment, since the honeycomb member 2 and the hollow cylindrical body 3 do not come into direct contact with the drawing die 5 during the drawing process, neither scratches nor baking cracks are produced on the outside surface of the hollow cylindrical body 3, and further, the soldering or welding of each part of the catalytic converter can be carried out under good conditions, i.e., without the usual contamination of the surface thereof by lubricating oil.

Note that in order to improve the forming accuracy, the dimensions after the springing back of the honeycomb members 2 and the outer cylindrical body 3 are preferably taken into account when determining the dimension of the straight part 5b.

Figure 5:
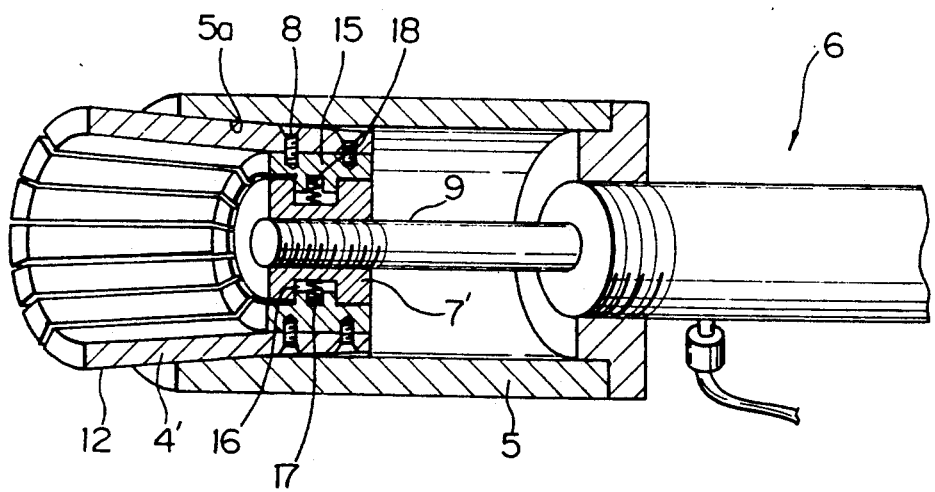
FIG. 5 is a partly cut-away perspective view of an apparatus for diametrically contracting the hollow cylindrical body, according to a second embodiment of the present invention.
Figure 6:
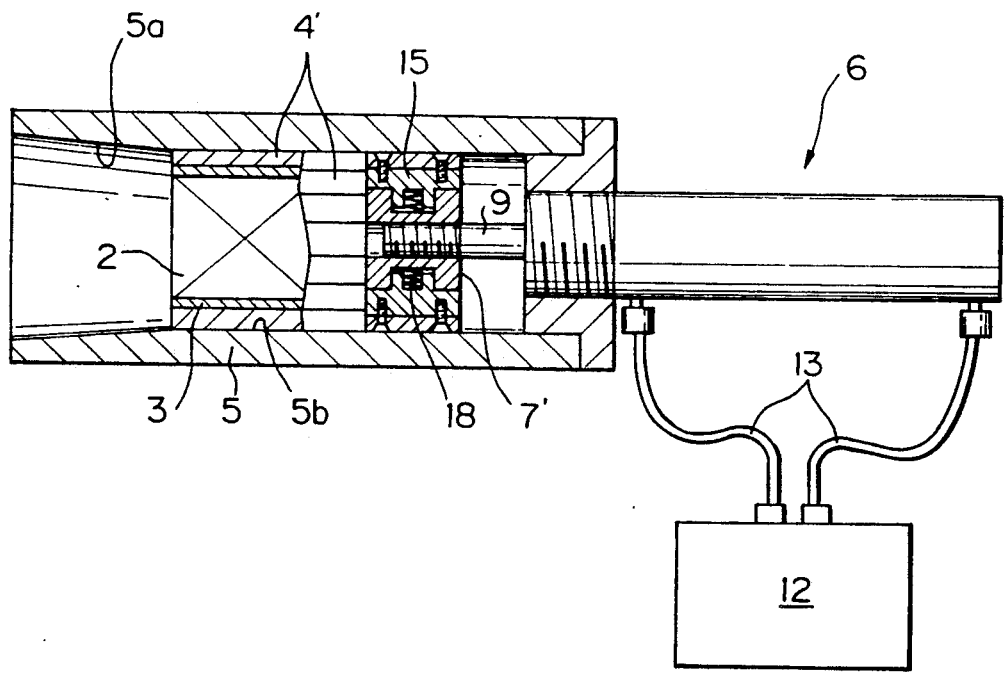
FIG. 6 is an axial cross-sectional view of FIG. 5, showing a condition after the grasping members are drawn in and the hollow cylindrical body is contracted to produce the desired finished product.

FIGS. 5 and 6 show a second embodiment of the present invention, by which a more compact contracting apparatus is provided than that provided in accordance with the above first embodiment.

Note, in these figures, elements similar to those of the first embodiment are indicated by the same reference numerals, and elements corresponding to those of the first embodiment are indicated by the same reference numerals suffixed with a prime.

According to this embodiment, the means for connecting the grasping members 4' with the actuator 6 comprises a plurality of supporting members 15, and a column 7' into which the rod 9 of the actuator 6 is screwed and fixed. As shown in FIG. 5, the column 7' is provided with a circumferential groove 16, and each of the supporting members 15 has a substantially T-shaped configuration and is fixed to each grasping member 4' by screws 8. In addition, a leg part of each supporting member 15 is provided with an orifice 17 for receiving a compression spring 18 therein.

In this arrangement, each supporting member 15 secured to a grasping member 4' is arranged around the column 7' so that the leg part of the supporting member 15 is engaged in the circumferential groove 16. According to this embodiment, the length of the leg part is shorter than the depth of the groove 16, and thus the compression springs 18 in the orifices 17 are seated on a bottom of the groove 16.

In operation, to grasp the hollow cylindrical body 3 containing the honeycomb member 2, the grasping members 4' are moved by the actuator 6 in such a manner that the members 4' protrude out of the opening of the drawing die 5, as shown in FIG. 5, and due to the tapered part 5a of the drawing die 5, the top of each the grasping members 4' is displaced radially outward by the action of the compression spring 18, whereby the diameter of the cylindrical space defined by the grasping members 4' is increased, and thus the hollow cylindrical body 3 can be easily inserted into the space defined by the grasping members 4'.

After the grasping members 4' grasp the body 3, as mentioned above, the operator actuates the operating lever (not shown in FIG. 6) of the driving unit 12 so that the actuator 6 draws the grasping members 4' into the drawing die 5. Consequently, the hollow cylindrical body 3 containing the honeycomb member 2 is forced to pass through the tapered part 5a and into the following straight part 5b, whereby the diameter thereof is contracted and the honeycomb member 2 is brought into firm contact with the inner surface of the hollow cylindrical body 3, and thus a catalytic converter having an accurate desired outside diameter is produced, as shown in FIG. 6.

According to this embodiment, because the grasping members 4' are easily radially displaceable, a more compact apparatus for diametrically contracting the hollow cylindrical body can be provided than that provided in accordance with the first embodiment of the invention in which, due to an outwardly curved configuration thereof, each grasping member must be of a certain length, to be able to form a space large enough to grasp the outer cylindrical body when outside of the drawing die, as shown in FIG. 3.

Figure 7:
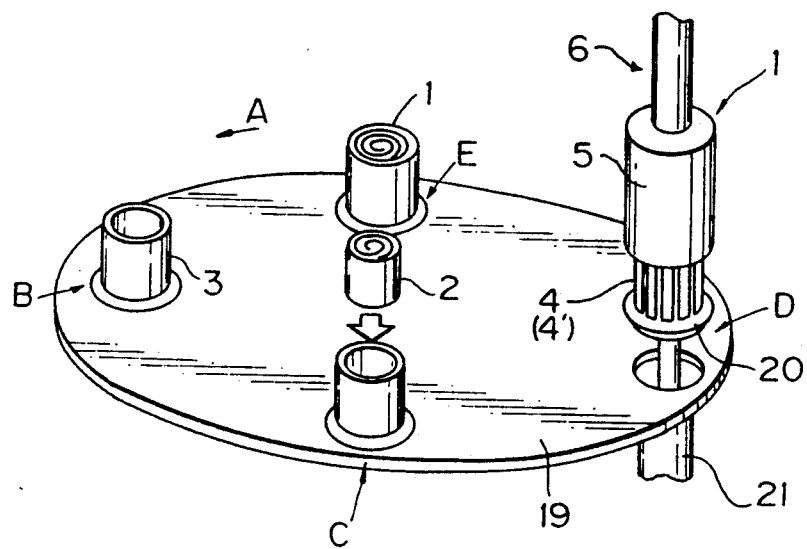
FIG. 7 is a perspective view of a part of a unit for continuously diametrically contracting hollow cylindrical bodies, wherein a method according to the present invention is adopted.

FIG. 7 shows a part of an installation for diametrically contracting the hollow cylindrical bodies in sequence, employing the above-mentioned apparatus in accordance with the present invention.

As shown in FIG. 7, a turntable 19 is provided on which hollow cylindrical bodies 3 to be diametrically contracted are arranged. In this operation, the turn table 19 is intermittently rotated in the direction shown by an arrow A and the hollow cylindrical body 3 is transferred from a position B to a position C on the turntable 19. There, the honeycomb member 2 is inserted into the hollow cylindrical body 3 and the hollow cylindrical body 3 containing the honeycomb member 2 therein is transferred to a position D, whereat the hollow cylindrical body 3 and the honeycomb member 2 are lifted by a lifting table 20 and pushed into a space defined by the grasping members 4 or 4'. The lifting table 20 is moved upward and downward by an actuator 21, such as a hydraulic cylinder, positioned under the turn table 19.

Next, the hollow cylindrical body 3 containing the honeycomb member 2 is drawn into the drawing die 5 by the grasping members 4, and the hollow cylindrical body 3 and the honeycomb member 2 are diametrically contracted. After this drawing operation the formed hollow cylindrical body 3 containing the member 2, i.e., the catalytic converter product, is pushed out of the drawing die 5 and is returned to the position D on the turntable 19, close to the lifting table 20. Finally, the catalytic converter is moved to a position E and is then removed from the turntable 19.

EXPERIMENT

To determine the effect of the present invention, a manufacturing experiment was executed under the following conditions.

First, to produce a catalytic converter having an outside diameter (OD) of 103 mm and a length (L) of 100 mm L and containing a honeycomb member having an OD of 100 mm, stainless steel plates having a thickness of 1.5 mm were prepared and bent to a C-shape cross section by a bending machine, and thereafter, were welded by a Gas Tungsten Arc Welding method to provide six hollow cylindrical bodies having an OD of 105 mm, an inside diameter of 103 mm and a length of 100 mm.

Further, a flat sheet and a corrugated sheet, both made from a stainless steel sheet having a thickness of 50 μm, were prepared and then laminated and wound together to provide honeycomb members having an OD of 101 mm and a length of 100 mm. Then, a brazing material containing a binder was partially coated on peripheral surfaces of the honeycomb members, and the coated honeycomb members were inserted into the hollow cylindrical bodies, respectively.

Next, the six hollow cylindrical bodies containing the honeycomb member were each placed in an apparatus having twenty grasping members 4' and the actuator of the apparatus was activated to draw in and diametrically contract the hollow cylindrical bodies to an outside diameter of 103 mm. Further, the contracted hollow cylindrical bodies were heated to a temperature of 1180° C. in a vacuum furnace, to braze the honeycomb members to the hollow cylindrical bodies and thereby provide six catalytic converters.

To compare the produced catalytic converters with the conventional converters, the inventors produced conventional converters as follows. First, stainless steel plates were bent to a C-shaped cross section by a bending machine, to provide the hollow cylindrical bodies (103 mm OD and 1.5 mm thick before welding). Next, in the same manner as above, honeycomb members (100 mm OD and 100 mm L) were prepared, and each was coated with the brazing material and then inserted into a hollow cylindrical body (not weld: C-shaped cross section), respectively. Although a gap of 0.5 mm existed between the two butting surfaces of the hollow cylindrical bodies, when the hollow cylindrical body was contracted by metal rings the gap was closed and the two butting surfaces were welded by a GTAW (Gas Tungsten Arc Welding) method. Then, to complete the samples for comparison with the present invention, the hollow cylindrical bodies were heated under the same condition as above to braze the honeycomb member to the hollow cylindrical body, and thus six conventional catalytic converters were produced.

The outside diameters at six points on each hollow cylindrical body were then measured during the manufacturing processes. The results are shown in a Table 1:

TABLE I

| Outside Diameter of Hollow Cylindrical Body | | | |
|---|---|---|---|
| Stage | After GTAW welding | After drawing | After brazing |
| the present method | | | |
| max. (mm) | 105.8 | 103.2 | 103.2 |
| min. (mm) | 104.2 | 102.9 | 102.8 |
| average (mm) | 105.0 | 103.0 | 103.0 |
| accuracy (%) | +0.8, −0.8 | +0.2, −0.1 | +0.2, −0.2 |
| the conventional method | | | |
| max. (mm) | 103.8 | — | 103.9 |
| min. (mm) | 102.2 | — | 102.2 |
| average (mm) | 103.0 | — | 103.0 |
| accuracy (%) | +0.8, −0.8 | — | +0.9, −0.8 |

As is apparent from Table 1, although the hollow cylindrical bodies originally have substantially identical accurate dimensions, an OD accuracy of ±0.2% is obtained both before and after the brazing in accordance with the present invention. On the contrary, according to the conventional method, only an OD accuracy of about ±1.0% was obtained, and thus it was not possible to assemble the finished conventional hollow cylindrical bodies into the engine parts to which they were to be fitted, and consequently, the outside surface thereof had to be refinished in a lathe, to improve the accuracy of the finished product.

After brazing, the catalytic converters produced by the present invention were cut open and the joint between the honeycomb member and the outer cylindrical body was inspected. As a result, it was recognized that the honeycomb member was joined to the hollow cylindrical body only at points at which the brazing material had been applied to the outside surface of the honeycomb member, and that since the contact between the flat sheet and the wavy sheet was ensured by the drawing, the brazing of the honeycomb member was also satisfactory.

According to the present invention, there can be provided a catalytic converter which has highly accurate dimensions after brazing and a heat treatment, and thus there is no need to refinish an outside surface of a hollow cylindrical body of the produced catalytic converter before assembling the same into an engine.

It will be understood by those skilled in the art that the foregoing description is of preferred embodiments of the method and apparatus for diametrically contracting a cylindrical body according to the present invention, and that various changes and modifications may be made thereto without departing from the spirit thereof. For example, as a modification of the second embodiment, an apparatus shown in FIG. 8 may be used.

According to this embodiment, an outside surface 4a of each grasping member 4" is formed to have the same inclination as an inside surface 5a of the die 5. Further, an inside surface 4b of the grasping member 4" is formed in such a manner that it constitutes a part of a cylindrical surface parallel to the longitudinal axis X of the apparatus. In addition, the cylindrical surface is so formed that, when the end surface of the grasping member 4" is flush with that of the die 5, as shown in FIG. 8, a diameter of the cylindrical surface will be identical to a required outside diameter of the outer cylindrical body 3.

Figure 8:
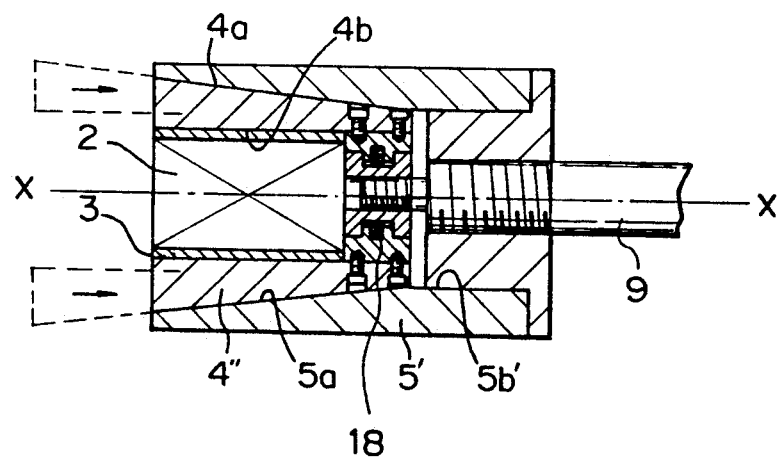
FIG. 8 is an axial cross-sectional view of a modification of the second embodiment of the present invention.
Figure 11:
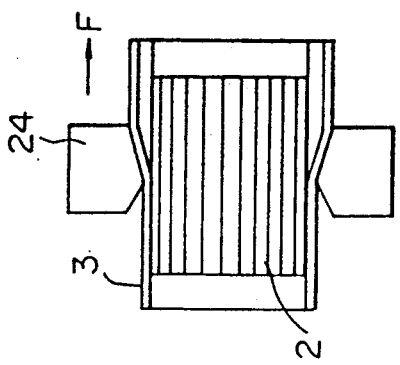
FIG. 11 is a cross-sectional view showing an another conventional method of diametrically contracting a hollow cylindrical body.
Figure 10:
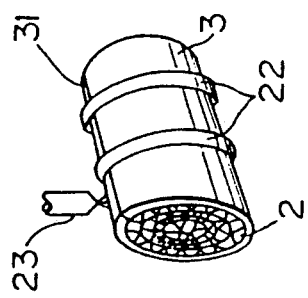
FIG. 10 is a perspective view showing a conventional method of integrating a honeycomb member with a hollow cylindrical body.
Figure 9:
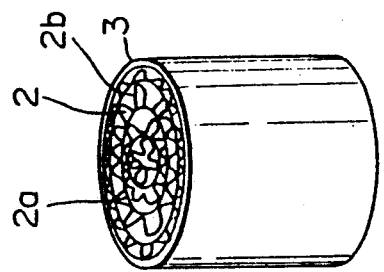
FIG. 9 is a perspective view of a catalytic converter.

As is apparent from FIG. 8, when the grasping members 4" are drawn into the die 5' by the actuator rod 9, each member 4" is moved moved radially inward to thus reduce the diameter of the cylindrical surface. Conversely, when the members 4" are moved out of the die 5', they are moved radially outward by the springs 18, to thereby increase the diameter of the cylindrical surface.

In use, first the grasping members 4" are pushed out of the die 5 to such an extent that the members 4" will not fall from the die 5, and then the cylindrical body 3 is placed inside the grasping members 4" to be drawn by the actuator rod 9. Note, the drawing movement of the rod 9 is determined in accordance with a value calculated from the required outside diameter of the cylindrical body 3. Note that, if the outside diameter of the so-formed cylindrical body 3 is larger than the required outside diameter, the drawing movement may be increased, to reduce the outside diameter of the cylindrical body 3.

According to this embodiment, a cylindrical body having any desired outside diameter can be produced by an appropriate setting of the drawing movement of the rod 9.

According to this embodiment, since there is no need to provide the drawing die 5' with a straight part 5b providing the final configuration of the outer cylindrical body 3, the length of the drawing die 5' can be reduced, and thus the size of the apparatus can be made smaller than that of the apparatus of the second embodiment.

We claim:

1. A method of sealingly fitting an element to a hollow cylindrical body, which method comprises the steps of:

providing a hollow cylindrical body containing an element inserted therein with a clearance therebetween, grasping said hollow cylindrical body from the outside thereof with a plurality of elongated grasping members arranged to surround said hollow cylindrical body, one end of each grasping member being fixed to a column member, providing a cylindrical drawing die having an opening at one end thereof, the inner bore of said die having a part thereof tapered in a direction extending away from said opening, wherein an inside diameter of at least a portion of said die which defines the tapered part of said bore gradually decreases as taken along the longitudinal axis thereof in said direction away from said opening, drawing said grasping members together with said hollow cylindrical body into said drawing die through said opening, applying a compression force to said hollow cylindrical body through the intermediary of said grasping members by drawing the grasping members through said portion of said drawing die to thereby diametrically contract said hollow cylindrical body into a sealed fit with said element contained therein, prior to said drawing, coating a brazing flux on one of an inside surface of said hollow cylindrical body and an outside surface of said contained element, and brazing said hollow cylindrical body to said contained element by applying a heat treatment thereto after said drawing is completed.

2. A method according to claim 1, wherein said step of providing a hollow cylindrical body containing an element inserted therein comprises providing a hollow cylindrical member containing therein a honeycomb member which constitutes a part of a catalytic converter for an automobile, and wherein the diametrical contraction of said hollow cylindrical body around said honeycomb member is carried out in the production of the catalytic converter.

3. A method according to claim 1, wherein said step of grasping comprises grasping said hollow cylindrical members with grasping members each having an outer surface which is inclined relative to the longitudinal axis of said die, and said step of applying a compression force is carried out by drawing the grasping member a predetermined amount through said portion of said drawing die.

* * * * *